United States Patent

[11] 3,621,219

[72] Inventors Isamu Washizuka
Osaka;
Kunio Yoshida, Osaka; Akihiko Kunikane, Nara-ken; Yoshinobu Kitagawa, Nara-ken, all of Japan

[21] Appl. No. 749,532
[22] Filed Aug. 1, 1968
[45] Patented Nov. 16, 1971
[73] Assignee Hayakawa Denki Kogyo Kabushiki Kaisha
Osaka, Japan
[32] Priority Aug. 15, 1967
[33] Japan
[31] 42/52316

[54] ARITHMETIC UNIT UTILIZING MAGNETIC CORE MATRIX REGISTERS
6 Claims, 34 Drawing Figs.

[52] U.S. Cl. .......... 235/170, 235/176
[51] Int. Cl. .......... G06f 7/50
[50] Field of Search .......... 235/170, 176; 340/172.5, 174, 174 M

[56] References Cited
UNITED STATES PATENTS

| | | | |
|---|---|---|---|
| 3,083,910 | 4/1963 | Berkin .......... | 235/170 X |
| 3,214,576 | 10/1965 | Propster, Jr. .......... | 235/170 X |
| 3,252,145 | 5/1966 | Denison et al. .......... | 340/172.5 |
| 3,469,242 | 9/1969 | Eachus et al. .......... | 340/174 M X |
| 3,521,043 | 7/1970 | Thompson .......... | 235/170 |

*Primary Examiner*—Malcolm A. Morrison
*Assistant Examiner*—David H. Malzahn
*Attorney*—Eugene E. Geoffrey, Jr.

ABSTRACT: A compact computer of the serial type using magnetic memory devices as registers with one register being connected to an indicating device for immediate external indication. By using the memory devices in an improved manner with buffer registers, the alternative readout and storage procedures are avoided and addition or subtraction of binary coded decimal numbers can be performed during the readout period and thereby reduce processing time. The computer also enables the application of a correction signal to the adder or subtractor during write-in and does not require a separate binary adder or subtractor. Left and right shift operations are simplified and when the value stored in the memory device is read out starting with the most significant position, one flip-flop is set by the most significant digit and the output is fed to an indicating tube. This eliminates the need for indicating meaningless zeros.

INVENTORS
ISAMU WASHIZUKA
KUNIO YOSHIDA
AKIHIKO KUNIKANE
YOSHINOBU KITAGAWA
BY
ATTORNEY

INVENTORS
ISAMU WASHIZUKA
KUNIO YOSHIDA
AKIHIKO KUNIKANE
YOSHINOBU KITAGAWA
BY
ATTORNEY

FIG.2J.
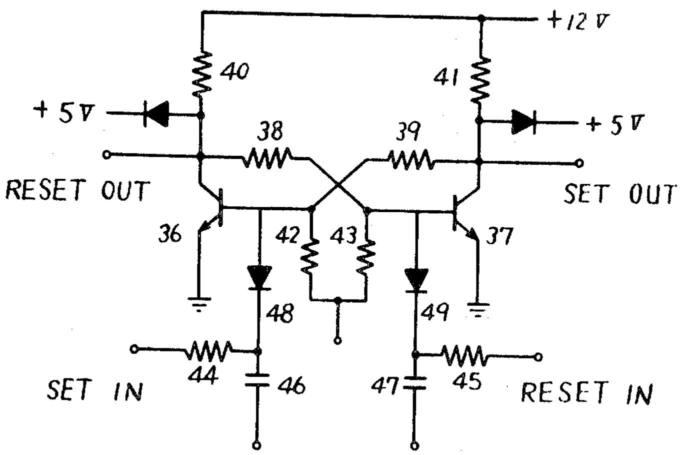
FIG.2I.
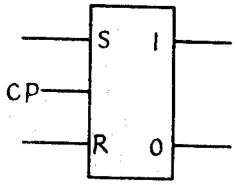
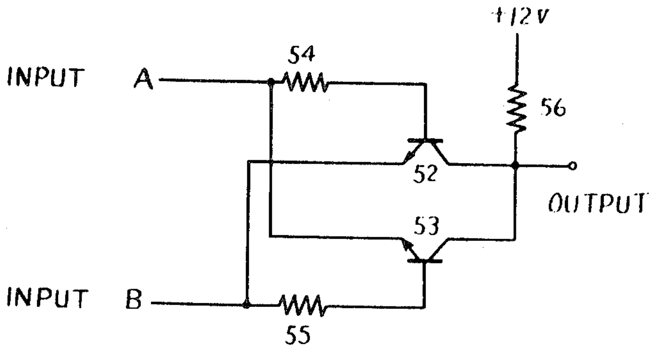
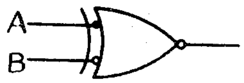
FIG.2K.
FIG.2L.
INVENTORS
ISAMU WASHIZUKA
KUNIO YOSHIDA
BY AKIHIKO KUNIKANE
YOSHINOBU KITAGAWA
ATTORNEY INVENTORS
ISAMU WASHIZUKA
KUNIO YOSHIDA
BY AKIHIKO KUNIKANE
YOSHINOBU KITAGAWA
ATTORNEY INVENTORS
ISAMU WASHIZUKA
KUNIO YOSHIDA
AKIHIKO KUNIKANE
YOSHINOBU KITAGAWA
BY
ATTORNEY INVENTORS
ISAMU WASHIZUKA
KUNIO YOSHIDA
BY AKIHIKO KUNIKANE
YOSHINOBU KITAGAWA
ATTORNEY

INVENTORS
ISAMU WASHIZUKA
KUNIO YOSHIDA
BY AKIHIKO KUNIKANE
YOSHINOBU KITAGAWA

ATTORNEY

INVENTORS
ISAMU WASHIZUKA
KUNIO YOSHIDA
BY AKIHIKO KUNIKANE
YOSHINOBU KITAGAWA
ATTORNEY

INVENTORS
ISAMU WASHIZUKA
KUNIO YOSHIDA
BY AKIHIKO KUNIKANE
YOSHINOBU KITAGAWA
ATTORNEY

INVENTORS
ISAMU WASHIZUKA
KUNIO YOSHIDA
BY AKIHIKO KUNIKANE
YOSHINOBU KITAGAWA
ATTORNEY

INVENTORS
ISAMU WASHIZUKA
KUNIO YOSHIDA
BY AKIHIKO KUNIKANE
YOSHINOBU KITAGAWA
ATTORNEY

INVENTORS
ISAMU WASHIZUKA
KUNIO YOSHIDA
BY AKIHIKO KUNIKANE
YOSHINOBU KITAGAWA
ATTORNEY

ARITHMETIC UNIT UTILIZING MAGNETIC CORE MATRIX REGISTERS

This invention relates to an electronic computer of relatively small size, and especially to a serially operated electronic computer of small size and which is light in weight affords high-speed, operation has a simplified shifting operation and includes means whereby unnecessary zeros above the most significant digit can be simply erased at the time of visual presentation of the result of the operation.

In the field of electronic computers, there is a substantial need for minimizing the size and weight, and in the case of table type electronic computers need is even greater. The decisive factors for making a small and light computer are to minimize the size and weight of parts, to minimize the number of parts, and to integrate parts. In achieving these ends the magnetic memory matrix affords the highest degree of integration and reliability and many have been utilized in large size electronic computers. However, since a magnetic matrix requires reading-in and writing-out operations at the time of storing and releasing stored information, it is not particularly suitable for a register in which the frequency of storing and releasing information is high. For the register of electronic computer the use of the magnetic memory matrix has therefore been avoided, and in many cases flip-flops have been used. However, if the magnetic memory device could be utilized in the register, it would enable the computer to be made small and light. In applying the magnetic memory device to a register, it would be recognized that various computer operations should be performed based upon a repetition of a read period and a write period alternately for each one bit time. More specifically, information of one bit would be read out, then transmitted to each unit of an operation device, and subsequently and immediately written into the original address. However, even if that method is employed many difficulties are still encountered. For example, in a case wherein the numerical information is to be registered in the form of binary coded decimal code (one digit = four bits) in core matrix planes and this information is to be added (subtracted) by a pure binary adder (subtractor), it is a well known fact that if a decimal carry (borrow) is produced a correction operation of +6 (−6) is necessary. According to the above mentioned read and write alternative repetition system, four times the repetition of alternative read and write periods per one bit is required for one digit time, and based upon such digit time addition (subtraction) the computation is performed. Thus said system requires one digit time (8-bit time) for each pure binary addition (subtraction process and decimal correction respectively. Thus two digit times (16-bit time) in total is required for addition (subtraction) processing of one digit unit. On the other hand, in the case of flip-flop register, the required time for one digit unit addition (subtraction) processing is 7- to 8-bit times. Since addition (subtraction) processing is also the basis for multiplication (division), shortening of the processing time is strongly desired.

At the time of a decimal correction operation, in practice, the output of a pure binary addition (subtraction) operation is stored in a register, the presence or absence of decimal carry (borrow) is judged from the contents thereof and if it is judged that a decimal carry (borrow) is required a converter disposed between digits of the register is operated based upon that judgment in order to apply a conversion operation of +6 to the addition (subtraction) output, and, thereby, a correction to a decimal number is performed; but it is necessary to dispose a converter between each adjacent digits of the register.

In order to achieve not only addition (subtraction) processing but also multiplication (division) processing, it is inevitable that the register include a shift function in order to transfer numerical values stored therein to the adjacent digit in order, but the magnetic memory matrix when used as a memory does not afford a shift function. However, even if it is desired to provide the magnetic memory matrix with a shift function in addition to read and write functions and coordinated with the aforementioned alternative repetition system there will be serious disadvantages since it may seem possible to make leftward shift by having each read out numerical value temporarily memorized externally and then writing it in the adjacent upper digit during the next write-in period. In the case of rightward shift it is impossible to reinsert a numerical value in the adjacent lower place digit immediately after that numeral value is once read out. As is the case of flip-flop register the leftward shift operation must be repeated for the number of times equal to whole digit number minus one, and thus considerable time.

Further, in the case of electronic table-type computer, it is necessary to externally indicate the operation result or the register contents and indicating tubes are used for visual presentation. Indicating devices in general are directly coupled to the register, and since the contents of the register may include a number of digits smaller than the number of indicating tubes zeros appear at the upper places above the most significant numerical value. Under these conditions the effective numeral value, especially the most significant digit, cannot be readily recognized. In order to prevent displaying of unnecessary zeros one arrangement may be used including a judging logic gate and not circuit for each of the whole digits of the register so that it can be determined whether the contents of the digits above *k*-th place digit are zeros or not. Based upon the result of a judgment indicating zeros above *k*-th place digit such zeros can be suppressed, but such an arrangement requires very complicated circuitry.

The key point of this invention is to solve simultaneously these problems. In the case of a serial-type operating device, in accordance with this invention, the magnetic memory matrix is employed in a new and improved manner for the register so that the size of the register is substantially reduced when compared to a flip-flop register, thereby and the size and weight particularly of a table type computer is minimized. At the same time the speed of the operation is increased, and the operation device the shift operation, the other circuitry can be greatly simplified.

In accordance with the invention the conventional read and write operations with respect to the magnetic memory device are improved so that it is not necessary to employ the aforementioned read and write alternative repetition system. With this improved system at the time of addition (subtraction) processing of binary coded decimal numbers pure binary addition (subtraction) processing is performed during read period. At the next write period decimal correction operation is performed, and thus the time required for decimal addition (subtraction) processing of one digit unit is reduced to about a half of that of the read and write alternative repetition system. This reduced time compares favorably with a conventional flip-flop register. Furthermore with this invention after a pure binary addition (subtraction) processing is performed during the read period the addition (subtraction) output together with a correction signal of +6 (−6) is returned to the same adder (subtractor) to apply a correction operation thereto without using separate pure binary adder (subtractor), and thus by fully utilizing just one adder (subtractor) the operation unit is further simplified.

A further advantage of this invention when using the above mentioned read and write operations is obtained in the case of rightward shift. For instance after a numerical value is once read out the write period corresponding to the lower place digit is immediately captured and the read out numerical value is promptly written in said lower place digit, thus both the rightward shift operation and the leftward shift operation can be very easily performed. At the time of indication of operation result, the numeral value stored in the magnetic memory device as a result of operation is read out from the most significant digit, whereupon just one flip-flop is set by the most significant digit (which is not zero) of the effective numerical value which appears first, and an indicating tube driving circuit is operated by this set output to eliminate meaningless zeros.

Other purposes and features of this invention will be more clearly understood from the description hereinafter made referring to the attached drawings.

In the drawings:

FIGS. 2A through 2L show logic circuits of a computer in accordance with the invention.

Figure 1:
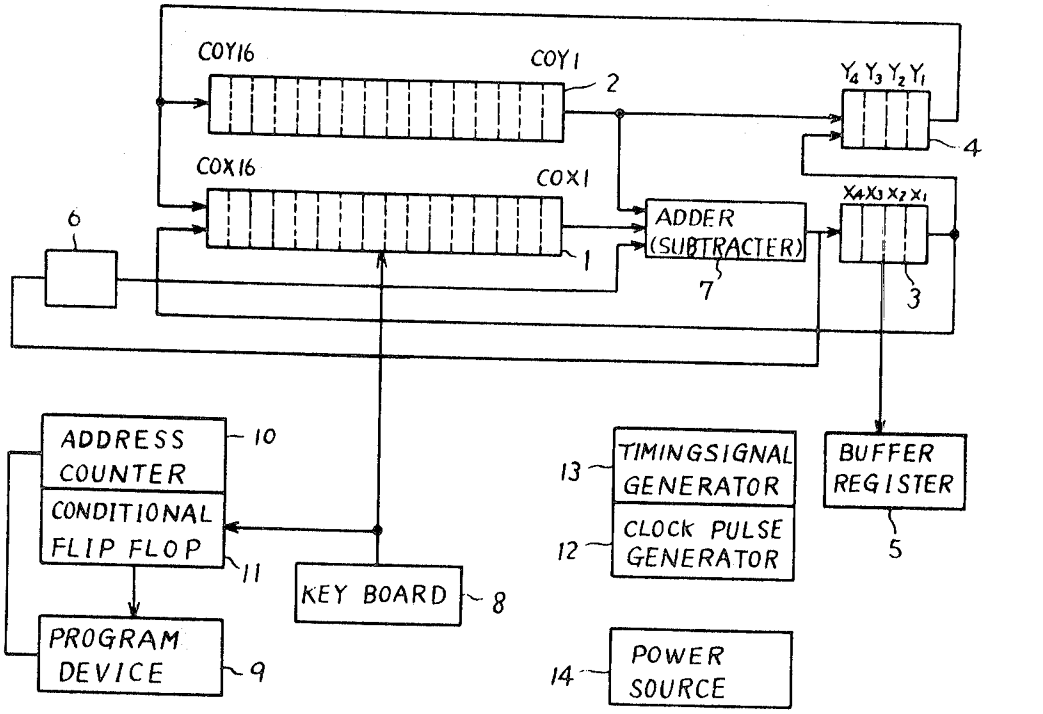
FIG. 1 is a block diagram of an electronic computer in accordance with this invention.

OUTLINE OF THE COMPUTER.

The drawings illustrate an actual example of a table type electronic computer which consists essentially of an operation unit and a control unit. The operation unit comprises main registers 1 and 2, buffer registers 3 and 4, an indicating buffer register 5, a decimal point register 6, an adder (subtractor) 7 and a keyboard 8. The control unit comprises a program device 9, an address counter 10, a conditional flip-flop 11, a clock pulse generator 12, and a timing signal generator 13. Further, a power source unit 14 is provided. The numerical value handled by the computer as a whole is of binary coded decimal code representation (1 digit = 4 bits).

Both of the main registers 1 and 2 include magnetic memory devices and these store the first operand, second operand or operation result. The storage capacity of each of said registers is a maximum of 16 digits (16×4 bits) of binary coded decimal numbers. Only the register 1 is directly coupled to the indicating device so that its storage contents can be immediately indicated externally. Detailed internal structures of the registers will be explained later. The buffer registers 3 and 4 are connected to the main registers 1 and 2, and each comprises four flip-flops with a capacity of one digit component. These buffer registers temporarily memorize the contents read out from the main registers 1 and 2. The adder 7 is capable of performing pure binary addition (subtraction) processes, and is a full adder (subtractor) to which addition input signals $a_1$ and $a_2$ and a carry (borrow) input signal $F_c$ representative of a carry (borrow) from lower place digit are applied. In addition, a carry (borrow) memory device is provided, which will be explained later. The buffer register 5 indicates the operation result or registered contents by means of sealed gas glow discharge tubes and temporarily memorizes the contents to be indicated and obtaining a decimal output for driving the discharge tubes. The decimal point register 6 comprises four flip-flops and has a capacity of one digit component. It memorizes the decimal point position of a numerical value as a numerical value information. The keyboard 8 comprises a figure setting key, various operation keys for operations such as indication, clearing, etc., and associated relays.

The program device 9 generates microorders which are necessary at the time of performance of various operation processes in the diode matrix system. The microorders are introduced into inputs of logic gates each arranged between units of the device and control the flow of numerical information. In this matrix, assume that several pieces or some tens of pieces of input address lines are prepared for multiplication processing and that an address line is selected. Output lines coupled thereto by diodes are driven to generate several kinds of microorders with the result that transfer of information between related devices is controlled. The address counter 10 designates in order program address lines as the operation process progresses. The conditional flip-flop 11 judges the internal states of various devices as is necessary during the development of the operation processes, and in accordance with the judgment the program address lines are branched and selected so that appropriate microorders are generated. As a result the efficiency of the operation processing is highly improved.

In addition to the above, judging flip-flops are provided within the computer. The clock pulse generator 12 generates clock pulses which control the various devices. The timing signal generator 13 generates bit time notifying signals, digit time notifying signals, and read and write instruction signals by modifying said chock pulses in various ways. These will be explained in connection with the generation of the timing signals. In the drawings, only certain of the information transmission lines between devices are shown.

Before explaining in detail each unit of the device, a brief explanation will be made of FIGS. 2A to 2L relating to the logic of basic circuits of the electronic computer and examples of typical circuits.

Figure 2A:
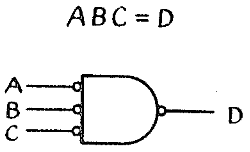
Figure 2B:
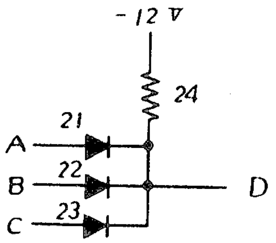
Figure 2C:
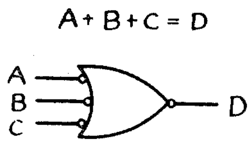
Figure 2D:
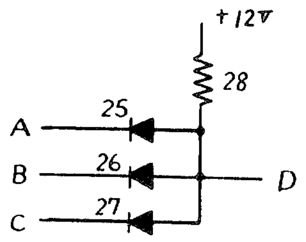
Figure 2E:
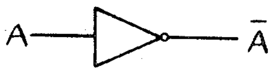
Figure 2F:
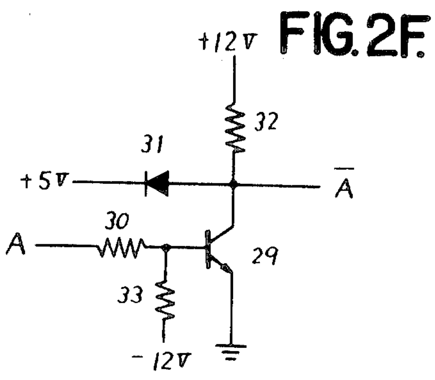
Figure 2G:
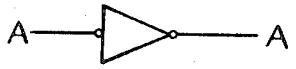
Figure 2H:
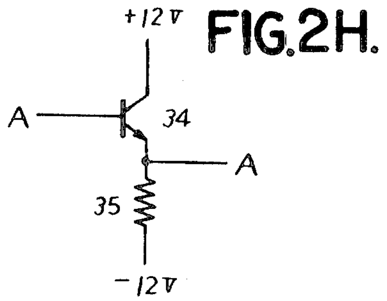

For a logic product, the logic diagram shown in FIG. 2A is used, and the actual circuit is shown in FIG. 2B. A plurality of diodes (three diodes are shown in the drawing) 21 through 23 are connected at one end to a load resistor 24, with the connecting point being an output terminal. The other ends of said diodes 21 through 23 are used as input terminals. For a logic sum, the logic diagram shown in FIG. 2C is used, and the actual circuit is shown in FIG. 2D. The circuit is same as that shown in FIG. 2B except that the polarity of diodes 25 through 27 and the polarity of a source of voltage supplied through the load resistor 28 are opposite. For an inverter, the logic diagram shown in FIG. 2E is used, and as is shown in FIG. 2F a transistor 29 is provided with input signals being applied to the base through a resistor 30. An inversion output is derived from its collector. Further, a clamp diode 31 and a load resistor 32 are connected to the collector thereof, and a bias resistor 33 is connected to said base. An emitter follower is represented by the diagram shown in FIG. 2G, and it is provided just with a transistor 34 and a load resistor 35 as is shown in FIG. 2H. An output signal is derived from the emitter of said transistor. For the flip-flop, the logic diagram shown in FIG. 2I is used. As is shown in FIG. 2J it is provided with two transistors 36 and 37, and the base of one transistor is DC directly coupled to the collector of the other transistor through resistors 38 and 39 respectively. Each of the collectors thereof is connected to a power source through load resistors 40 and 41 respectively, and emitters are grounded. A bias voltage is applied through resistors 42 and 43 to respective bases thereof. The flip-flop further comprises resistors 44 and 45, condensers 46 and 47 and diodes 48 and 49 as trigger gates. For an exclusive logic sum, the logic diagram shown in FIG. 2K is used, and it is arranged, as is shown in FIG. 2L, to include two transistors 52 and 53 with the base of one transistor is coupled with the emitter of the other transistor through resistors 54 and 55 respectively. The input signals are introduced into each of the coupling points. The collectors of these transistors are commonly connected and a power source voltage is applied through a load resistor 56. The output signal is derived from the common connecting point.

Timing Signal

Figure 3A:
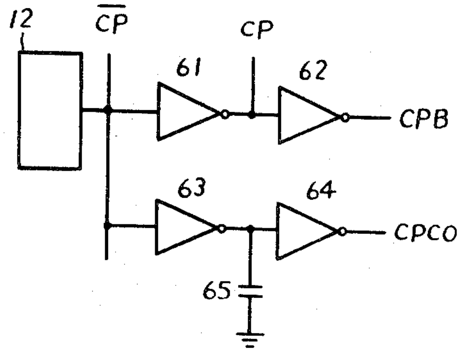
FIGS. 3A through 3I show various kinds of timing signals for synchronously controlling the computer and concrete examples of devices for generating said signals.
Figure 3B:
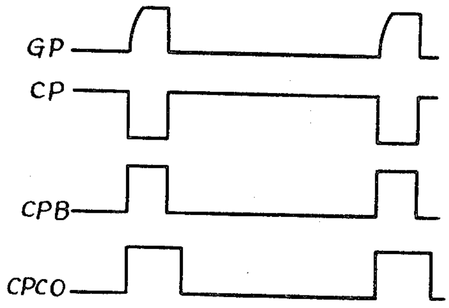
Figure 3C:
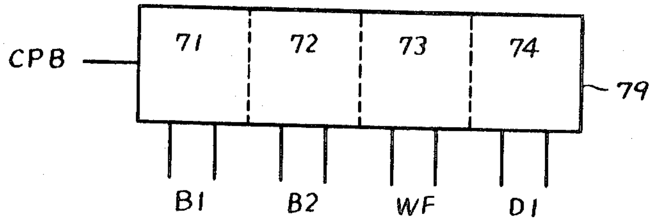
Figure 3D:
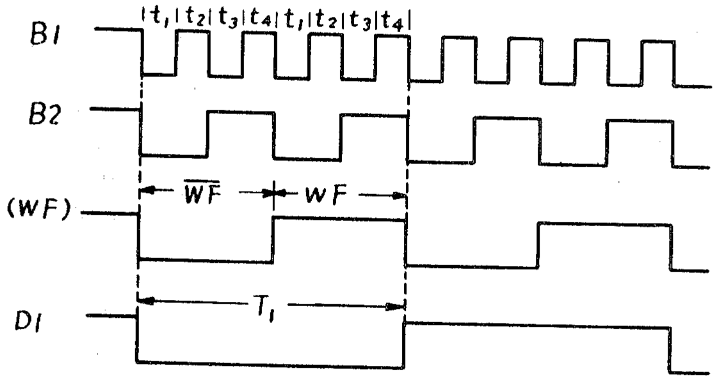

The basis of various timing signals for synchronously controlling the serial type operation device as a whole is the chock pulse CP which is obtained from the clock pulse generator 12. The basic frequency thereof is 100 kc., and the time interval thereof is 10 microseconds. The pulse generator 12 includes a multivibrator which oscillates at 100 kc. and by supplying the output therefrom to the timing signal generator 13 various timing signals are produced. Concretely speaking, as is shown in FIG. 3A, two stage inverters 61 and 62 are connected to the output side of the pulse generator 12, and clock pulse CPB for producing the timing signals is derived from the output end thereof. The output clock pulse is in reverse phase relation with respect to the chock pulse CP shown in FIG. 3B. The clock pulse for driving the cores, CPCO, is obtained through two stage inverters 63 and 64 and a pulse width enlarging condenser 65 from the pulse generator 12. The timing signal generator 13 comprises eight flip-flops 71, 72, 73, 74, 75, 76, 77, and 78 and a decoder, and by simply cascade connecting four flip-flops 71, 72, 73, and 74, as is shown in FIG. 3C, an octal notation counter 79 which performs frequency division operation is obtained. Operation wave forms of each part thereof are shown in FIG. 3D. The flip-flops 71 and 72 cooperate to work as a quaternary notation counter, and output signals B1 and B2 are utilized for producing bit time signals $\Phi_1$–$\Phi_4$ which represent bit times $t_1$–$t_4$. Establishing conditions for obtaining the bit time signals $\Phi_1$–$\Phi_4$ is shown by the following equations.

$$\phi_1—\overline{B1}\cdot\overline{B2}=\overline{(B1+B2)}$$

$$\phi_2—B1\cdot\overline{B2}=\overline{(\overline{B1}+B2)}$$

$$\phi_3—\overline{B1}\cdot B2=\overline{(B1+\overline{B2})}$$

$$\phi_4—B1\cdot B2=\overline{(\overline{B1}+\overline{B2})}$$

Figure 3E:
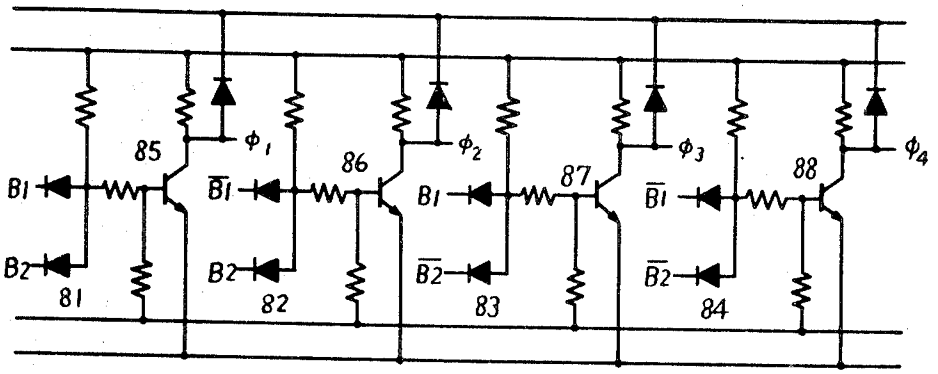
Figure 3F:
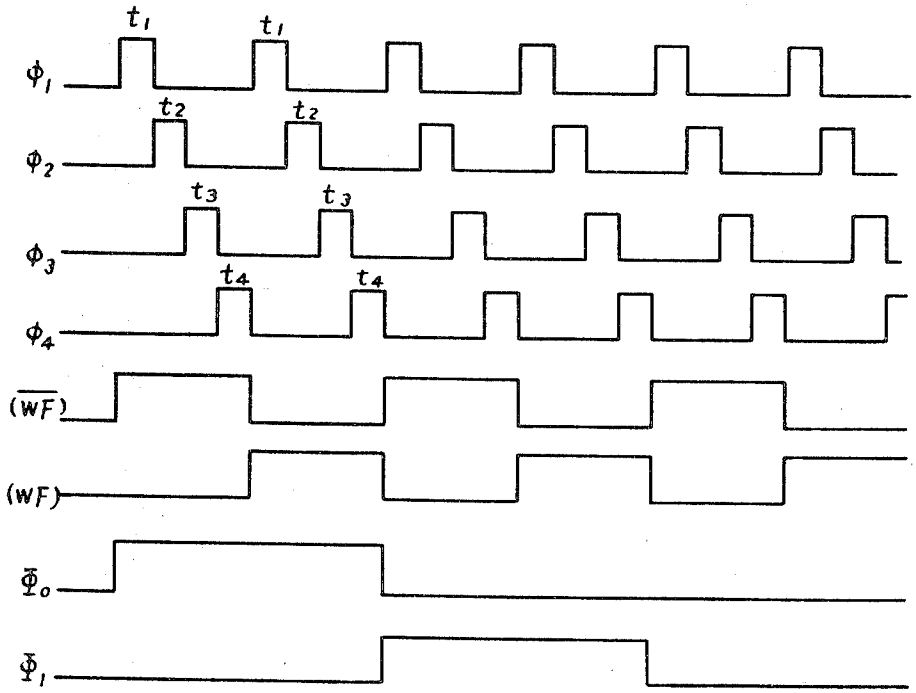

The decoder for actually obtaining the bit time signals $\Phi_1$–$\Phi_4$ is shown in FIG. 3E. In the decoder conversion output signals or the bit time signals $\Phi_1$–$\Phi_4$ are obtained through OR-gates 81–84 each consisting of two diodes and transistor inverters 85–88. The state of the flip-flop 73 is inverted for each 4 bit times and its state $\overline{WF}$ is utilized as a read instruction and its state WF is utilized as a write instruction with respect to the core matrix plane (the registers 1 and 2). The state of the flip-flop 74 is inverted for each 8 bit times, and the period of its output D1 is corresponds to one digit time $T_1$. The relation of these timing signals is shown in FIG. 3F. It should be noted especially that in accordance with this invention the read period and write period each continues for four bits. In other words, as was previously explained, and different than the conventional system in which read and write are repeated for each one bit, the read and write periods according to this invention are repeated for each digit of numerical value information. This largely facilitates the simplification of the operation device and the speeding up of the operation efficiency. More specifically, this point is the basis of this invention. It is different from the conventional system wherein information is read out from the magnetic memory matrix for each one bit, since with this invention the read operation is continued covering one digit unit instead of one bit unit of the numerical value information, the read out contents are temporarily stored in parallel in the buffer register 3 having one digit capacity, and subsequent to said read cycle a write operation is similarly performed for the time or for the number of times corresponding to one digit unit.

The flip-flops 74–78 constitute counter, and each of outputs D1–D5 therefrom is utilized for producing signals $_0$– $_{19}$ which represent digit times $T_0$–$T_{19}$. In this case, $2^5$ states in total can be produced, but since in practice only 20 states are required the balance, 12 states, are cancelled, and a jumping operation to return back to the first state is performed. Further, as it is necessary at the time of rightward shift to invert the counter a mere cascade connection will not do, and, in addition, the logics of the set input side and the reset input side inevitably become complicated, and, therefore, a special arrangement is provided in order to overcome these problems as will be explained later.

Figure 3G:
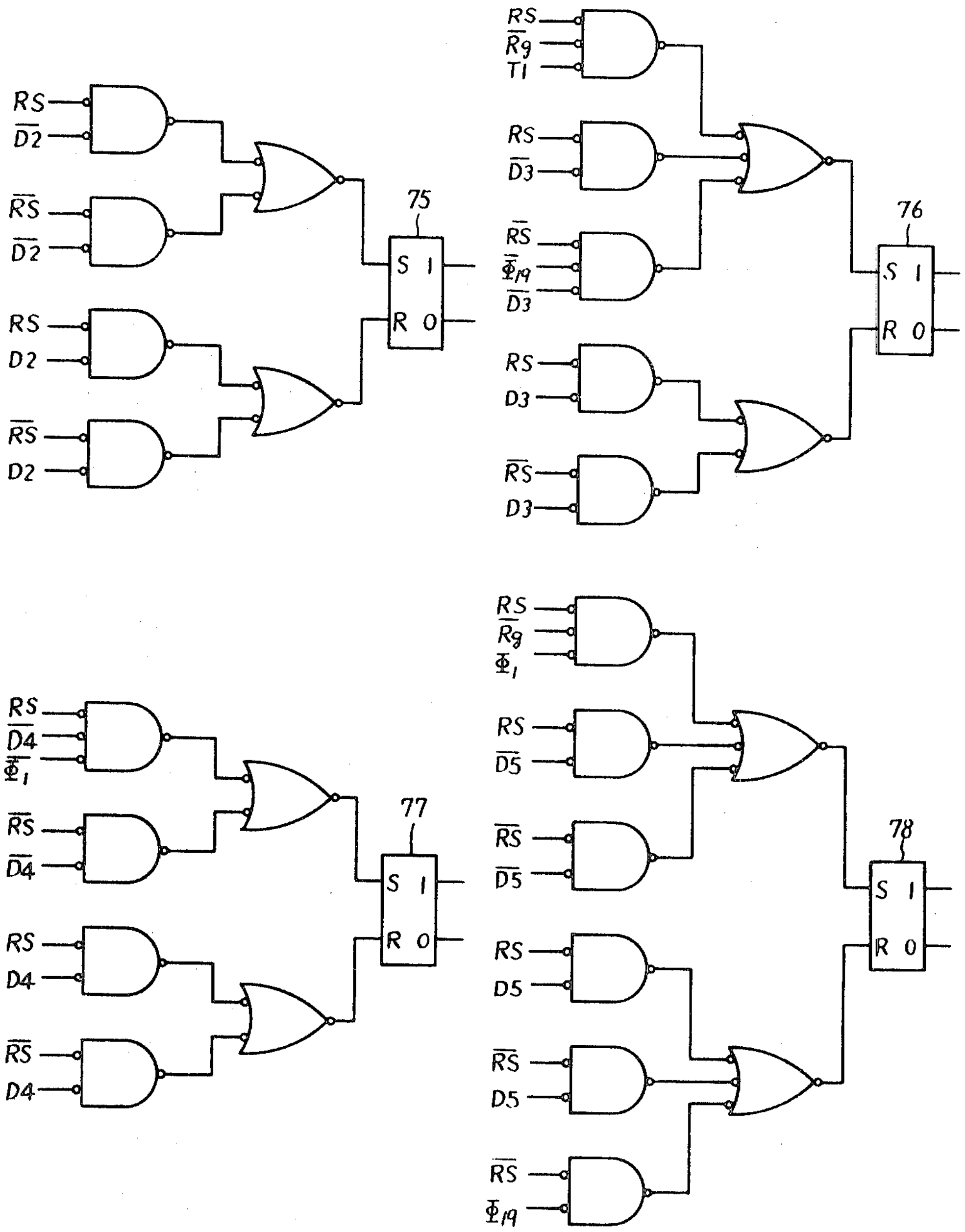

As is shown in FIG. 3G, the logic constitution of the input side of the flip-flops 75–78 is as follows. In the following equations, FF is a flip-flop, RS is an inversion instruction signal, and $\overline{Rg}$ is a jump instruction signal.

FF 75 set input $=RS\cdot\overline{D2}+\overline{RS}\cdot\overline{D2}$

FF 75 reset input $=RS\cdot D2+\overline{RS}\cdot D2$

Figure 3H:
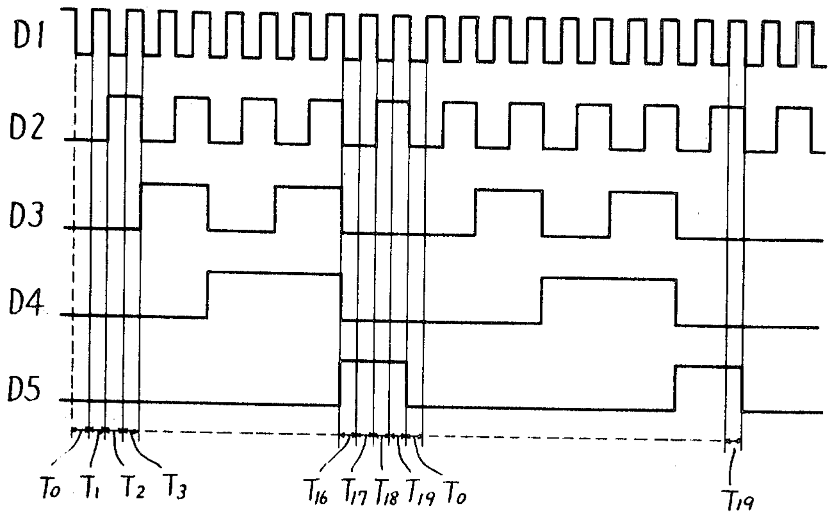

FF 76 set input $=RS\cdot\overline{Rg}\cdot\Phi_1+RS\cdot\overline{D3}+RS\cdot\Phi_{19}\cdot\overline{D3}$ FF 76 reset input $=RS\cdot D3+\overline{RS}\cdot D3$ FF 77 set input $=RS\cdot\overline{D4}\cdot\Phi_1+\overline{RS}\cdot\overline{D4}$ FF 77 reset input $=RS\cdot D4+\overline{RS}\cdot D4$ FF 78 set input $=RS\cdot\overline{Rg}\cdot\Phi_1+RS\cdot\overline{D5}+\overline{RS}\cdot\overline{D5}$ FF 78 reset input $=RS\cdot D5+\overline{RS}\cdot D5+\overline{RS}\cdot\Phi_{19}$ The condition for the establishment of the digit time signals is listed below with reference to FIG. 3H in which operation waveforms of the flip-flops 74–78 are shown.

$$\Phi_0—\overline{D1}\cdot\overline{D2}\cdot\overline{D3}\cdot\overline{D4}\cdot\overline{D5}=\overline{(D1+D2+D3+D4+D5)}$$

$$\Phi_1—\overline{D1}\cdot\overline{D2}\cdot\overline{D3}\cdot\overline{D4}\cdot\overline{D5}=\overline{(\overline{D1}+D2+D3+D4+D5)}$$

$$\Phi_2—\overline{D1}\cdot D2\cdot\overline{D3}\cdot\overline{D4}\cdot\overline{D5}=\overline{(D1+\overline{D2}+D3+D4+D5)}$$

.

.

.

.

.

$$\Phi_{19}—D1\cdot D2\cdot D3\cdot D4\cdot D5=\overline{(\overline{D1}+\overline{D2}+\overline{D3}+\overline{D4}+\overline{D5})}$$

Figure 3I:
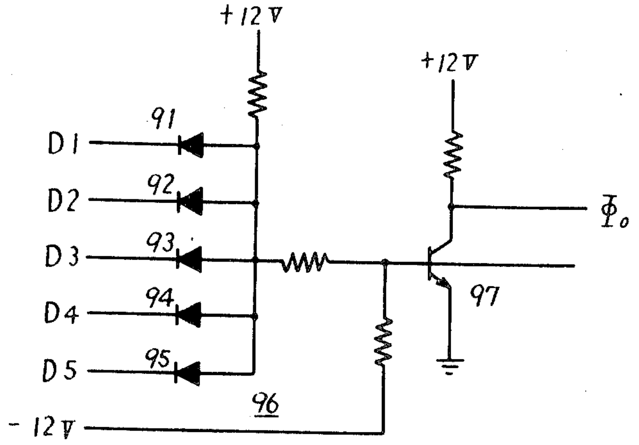

The structure of the decoder for actually obtaining the digit time signals $_0$– 19 may be similar to that of the case of aforementioned bit time signals, and a part thereof is shown in FIG. 3I. As can be seen from said drawing, said decoder comprises a plurality of diodes 91–95 which form a logic sum 96, and a transistor inverter 97.

Structure of Register

Figure 4A:
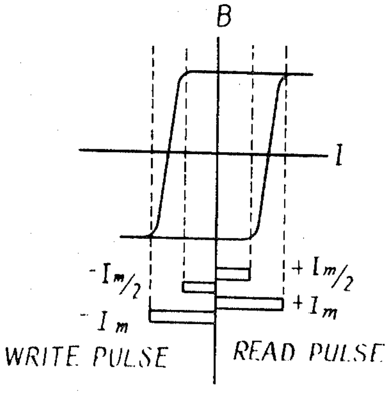
FIGS. 4A through 4C show circuits and graphs illustrating the structure and operation of the registers.

In an actual example of the register, a core matrix plane is used. The core in general is a small annular core made of a ferromagnetic material, and by making positive and negative states of its residual magnetic flux to correspond to "0" and "1" it will memorize binary value information. In order to derive its memory contents, it is necessary to cause a current $+I_m$ exceeding its coercive force to flow through driving lines as is shown in FIG. 4A, and a current coincidence system is employed as the driving method. This means that cores are arranged in a matrix, a current of $I_m/2$ is caused to flow through its column direction driving line and row direction driving line respectively so that a current $I_m/2+I_m/2$ flows through a core at the crossover of said two lines. Thus the core at the location where the selected column direction driving line and the selected row direction driving line coincide is selected and at the same time the information therein is read out or an information is written in. It is necessary, of course, to cause the direction of flow of the read current pulse to be and write current pulse mutually opposite.

At the time of selection of the column and row direction driving lines, a unique method is employed to utilize a transistor switching device, which provides an efficiency that is very high compared to the most popular selection system generally used.

Figure 4B:
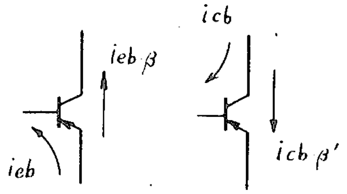

The structure of transistor includes two symmetrical PN junctions and amplification operation can be obtained between the emitter and collector and between the collector and emitter with a little difference in the amplification degree. In the case of forward direction (emitter to collector), as is shown in FIG. 4B, when a base current *ieb* flows, a current $ieb\times\beta$ can be obtained at the collector side. On the other hand, in the case of reverse direction (collector to emitter, when a base current *ieb* flows, a current $ieb\times\beta'$ can be obtained at the emitter side. $\beta$ is a forward direction amplification degree and $\beta'$ is a reverse direction amplification degree. With the application of the above-mentioned principle, the transistors are utilized as bidirectional switching devices for the selection of the column and row direction driving lines.

Figure 4C:
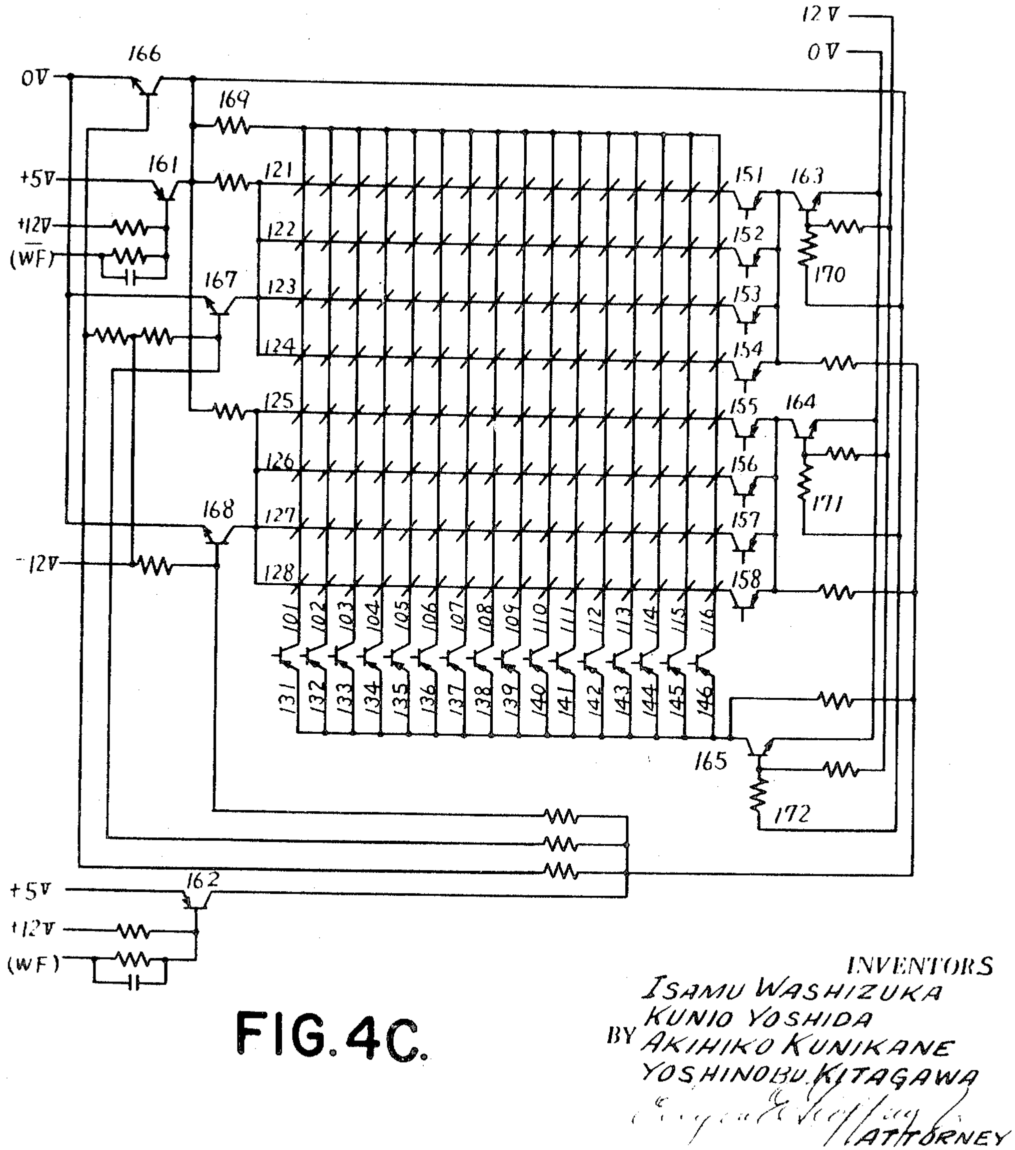

The computer in accordance with this invention comprises two core registers 1 and 2 for simultaneously registering a first operand and a second operand of binary coded decimal numbers of 16 digits (16×4 bits), for example. As is shown in FIG. 4C, there are (16×8) cores, 16 column direction driving lines 101–116, and 8 row direction driving lines 121–128. These two kinds of the driving lines are extended mutually orthogonally penetrating through the cores to form a matrix. Further, the registers 1 and 2 are respectively provided with independent sense lines (not shown). The driving lines 101–116 and 121–128 are each provided with one of transistors 131–146, and 151–158 respectively which perform the aforementioned bidirectional switching operation. The column direction of the matrix corresponds to a digit position of the register, and the row direction thereof corresponds to a bit position of each digit. The left end of the column direction corresponds to the least significant digit, and the upper end of the row direction corresponds to the least significant bit.

Concretely speaking, the selection transistors of the column direction are driven in synchronization with respective corresponding digit times ($T_2$–$T_{17}$out of $T_0$–$T_{19}$), and a half value current $I_m/2$ is caused to flow therethrough to select the digit position. The transistors of the row direction, on the other hand, are driven in synchronization with respective corresponding bit times ($t_1$–$t_4$) to select the bit position, and the core at the intersection of the column and row driving lines is selected and is driven. For example, if that a decimal number 3 (binary number 0011) stored in the second place digit of the register 1 is to be read out, the digit time $T_3$ is captured to drive the switching transistor therewith so that a half value current is caused to flow through the column direction driving line 102, and the row direction driving lines 121–124 are selected in order in synchronization with the bit times $t_1$–$t_4$. Thereby, at the times $\overline{WF}t_1$ (the bit time $t_1$ being within the read period and like interpretation is applicable to similar terms hereinafter used) and $\overline{WF}t_2$ an output "1" is obtained from said sense line at each time respectively, at the following times $\overline{WF}t_3$ and $\overline{WF}t_4$ an output "0 " is obtained each time respectively, and thus the stored contents of one digit unit (0111) is derived. On the other hand, in the case that decimal number 3 is to be written in the second place digit thereof, the switching transistor 132 of the column direction is driven during the time WFT3 (the digit time $T_3$ in the write period) in order to select the column direction driving line 102, and a half value current is caused to flow through the row direction driving lines, 121 and 122 only at the bit times $t_1$ and $t_2$. It should be noted that the read operation and the write operation respectively are exclusively performed for a 4 bit unit (1 digit unit).

The peripheral circuit of the matrix comprises a read drive amplifier 161, a write drive amplifier 162, read exclusive switches 163–165, and write exclusive switches 166–168. The read drive amplifier 161 includes a PNP-transistor. The read instruction signal ($\overline{WF}$) is introduced to the base of said transistor its collector is connected through a resistor 169 to one end of column direction driving line group and is also connected through resistors 170, 171 and 172 to the bases of NPN-transistors which constitute read exclusive switches 163, 164 and 165. The switch 163 controls the row direction driving line group of the core register 1, the switch 164 controls the row direction driving line group of the core register 2, and the switch 165 is to switchingly control the column direction driving line group. A proper bias voltage is applied between the base and the collector of each of the transistors which constitute the switches 163–165. The write drive amplifier 162 also includes a PNP-type transistor, and the write instruction signal (WF) is introduced to its base. Write exclusive switches 166–168 are associated with the amplifier 162. The switch 166 controls the column direction driving line group, the switch 167 controls the row direction driving line group of the core register 1, and the switch 168 controls the row direction driving line group of the core register 2.

When the read drive amplifier 161 operates, the read exclusive switches 163–165 connected thereto all switched to the "ON" state, the lower end of the column direction and the right end of the row direction are thereby placed at ground potential respectively, and the potential arrangement becomes such that the half value current of the column direction flows downwardly and the half value current of the row direction flows to the right. When the write drive amplifier 162 operates, the write exclusive switches 166–168 are switched to the "ON" state, and the upper end of the column direction and the left end of the row direction are placed at ground potential respectively. Thus by an ingenious combination of said read and write drivers and the bidirectional selection transistors the peripheral circuit of the core matrix registers 1 and 2 is materially simplified.

Adder (subtractor)

Figure 5A:
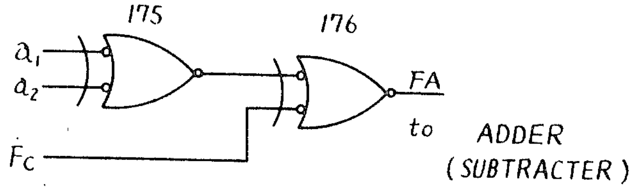
FIGS. 5A through 5D show in details a concrete example of an adder (subtractor).

The pure binary adder itself is a full adder having three inputs and consists of a two step stack circuit of exclusive logic sums 175 and 176 as is shown in FIG. 5A. Its logic is represented by the following equation wherein $a_1$ and $a_2$ are addition input signals, and $F_c$ is a signal to carry from a lower place.

$$\begin{aligned}\Sigma(a_1, a_2, F_c) &= a_1a_2F_c+a_1\overline{a}_2\overline{F}_c+\overline{a}_1\overline{a}_2F_c+\overline{a}_1a_2\overline{F}_c\\ &=(a_1\overline{a}_2+\overline{a}_1a_2)\overline{F}_c+(a_1a_2+\overline{a}_1\overline{a}_2)F_c\\ &=A\overline{F}_c+\overline{A}F_c \text{ wherein } A=a_1\overline{a}_2+\overline{a}_1a_2\\ &=A\oplus F_c\\ &=(a_1\oplus a_2)\oplus F_c\end{aligned}$$

The condition for the production of carry (borrow) between bits accompanying said addition output is given by the following equation which is well known.

$$C^{n+1}\overline{Sb}(a_1a_2+a_1F_c+a_2F_c)^n+Sb(\overline{a}_1a_2+\overline{a}_1F_c+a_2F_c)^n$$
$$=(a_2F_c)^n+(a_1\overline{Sb}+\overline{a}_1Sb)(a_2F_c)$$

wherein $Sb$ is a subtraction instruction signal, and $n$ and $n+1$ are bit times.

Figure 5B:
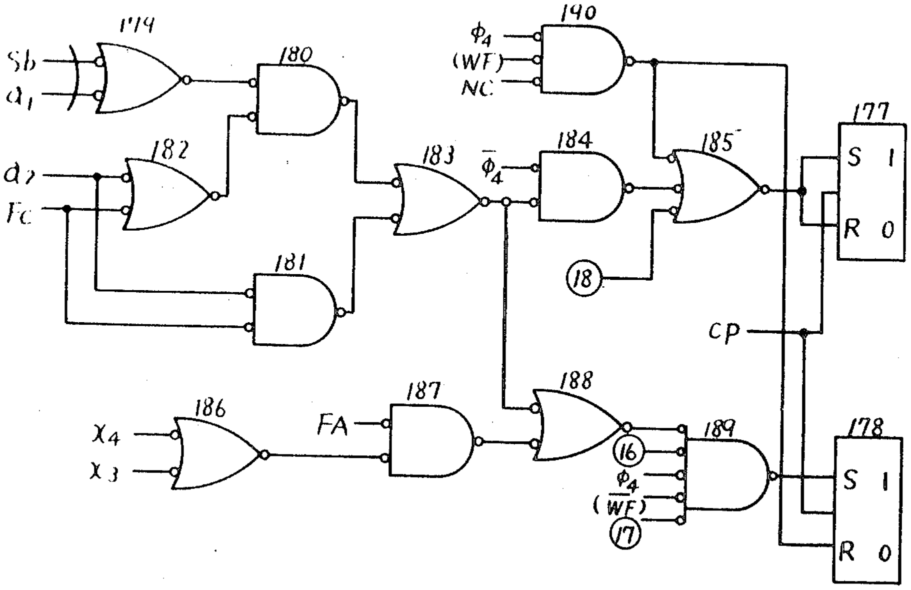

The above two equations are handled in pure binary manner, and the adder (subtractor) herein described requires means for decimal correction. Therefore, as is shown in FIG. 5B, a flip-flop 177 for memorizing a carry (borrow) between bits (including a carry (borrow) between the uppermost place bit and the lowermost place bit of next place digit) and a flip-flop 178 for memorizing a carry (borrow) between digits are provided. As was previously mentioned, the condition of occurrence of said carry (borrow) is pure binary, and in the case that one digit comprises four bits, a carry (borrow) to upper place digit occurs for the first time at and above $2^4$, but in the case of the adder (subtractor) herein described in order to convert a pure binary addition (subtraction) result to a binary coded decimal number a carry (borrow) signal must be produced for all of the numeral values exceeding 9. At the time of production of this decimal carry (borrow) signal $Nc$, it is necessary not only to judge the presence or absence of binary carry (borrow) signal $C$ which is produced after an addition (subtraction) of four bits but also to judge whether or not the bit values of the second, third and fourth places of the result of addition (subtraction) coincide with the following judgment equation. The carry (borrow) between digits is memorized in the flip-flop 178.

$$N_c=d_4\cdot d_3+d_4\cdot d_2+c=d_4(d_3+d_2)+c$$

The judgment will be easily understood from the following truth table.

| Decimal Number | Carry | Binary code | Binary coded decimal code | |
|---|---|---|---|---|
| 0 | | 0 0 0 0 | 0 0 0 0 | |
| 1 | | 0 0 0 1 | 0 0 0 1 | |
| 2 | | 0 0 1 0 | 0 0 1 0 | |
| 3 | | 0 0 1 1 | 0 0 1 1 | |
| 4 | | 0 1 0 0 | 0 1 0 0 | |
| 5 | | 0 1 0 1 | 0 1 0 1 | |
| 6 | | 0 1 1 0 | 0 1 1 0 | |
| 7 | | 0 1 1 1 | 0 1 1 1 | |
| 8 | | 1 0 0 0 | 1 0 0 0 | |
| 9 | | 1 0 0 1 | 1 0 0 1 | |
| 10 | | 1 0 1 0 | 0 0 0 0 | $d_4\cdot d_2$ |
| 11 | | 1 0 1 1 | 0 0 0 1 | $d_4\cdot d_2$ |
| 12 | | 1 1 0 0 | 0 0 1 0 | $d_4\cdot d_3$ |
| 13 | | 1 1 0 1 | 0 0 1 1 | $d_4\cdot d_3$ |
| 14 | | 1 1 1 0 | 0 1 0 0 | $d_4\cdot d_3$ |
| 15 | | 1 1 1 1 | 0 1 0 1 | $d_4\cdot d_3$ |
| 16 | 1 | 0 0 0 0 | 0 1 1 0 | C |
| 17 | 1 | 0 0 0 1 | 0 1 1 1 | C |
| 18 | 1 | 0 0 1 0 | 1 0 0 0 | C |
| 19 | 1 | 0 0 1 1 | 1 0 0 1 | C |

In practice, the output of the adder (subtractor) is stored in the buffer register 3, and, therefore, at the time $\overline{WF}t_4$ at which addition (subtraction) is completed the presence or absence of a decimal carry (borrow) is judged by determining the adder (subtractor) output signal FA and the bit values $X_3$ and $X_4$ of the third and fourth places of the buffer register 3. The logic of the carry (borrow) memory devices 177 and 178 is as follows.

In FIGURE 5B, in order to judge the binary carry (borrow) between bits a gate network is used which includes an exclusive logic sum 179, two AND-gates 180 and 181 and two OR-gates 182 ad 183, and the output signal therefrom is introduced to an AND-gate 184 which includes an input terminal to which the signal $\overline{\Phi}_4$ if introduced, and further said output signal is introduced also to the carry (borrow) flip-flop 177 through an OR-gate 185. On the other hand, for the judgment of decimal carry (borrow), in addition to the above-mentioned gate network output a gate network output through OR-AND-gates 186 and 187 to which the adder (subtractor) output signal FA and the contents $X_3$ and $X_4$ of the buffer register are applied as an input is introduced to an OR gate 188, and it is further introduced to the other flip-flop 178 through an AND-gate 189 which includes input terminals to which ($\overline{WF}$), the signal $\Phi_4$ and microorders ⑯ and ⑰ are introduced. At the time of shifting the result of addition (subtraction) precessing to next place digit, it is necessary to make the decimal carry (borrow) signal as a third input signal for the adder (subtractor), and, therefore, an AND-gate 190 is provided, and its output is transmitted to the flip-flop 177 at the time $WFt_4$. ⑯, ⑰, ⑱, etc., are microorders from the program device 9. (WF) and ($\overline{WF}$) respectively are the signals which indicate the write period WF and the read period $\overline{WF}$.

It is necessary in order to convert the result of pure binary addition (subtraction) to a binary coded decimal number to perform a correction operation based upon the result of judgement of presence or absence of decimal carry (borrow). In the device in which this invention is embodied, the aforementioned driving system in which the read period and the write period respectively are continued for four bits or one digit unit time is employed. In the read period $\overline{WF}$ of four bit times a pure binary addition (subtraction) processing of four bits is performed and at the same time the addition (subtraction) result thereof is fed to the buffer register 3 having a four bit capacity, then in the write period WF of four bit times a correction signal is generated based upon the decimal judgment, and by said correction signal a correction operation is applied to the addition (subtraction) result.

More specifically, the following operation is performed wherein A and B are two numbers.

1. In the case of addition

A+B≧10 The flip-flop 178 is set. (A correction by +6 is performed.)

A+B<(No correction is made.)

2. In the case of subtraction

A−E≧10 (No correction is made.)

A−B<The flip-flop 178 is set. (A correction of −6 is performed.)

In the case of addition, at the time $\overline{WF}t_4$ under the condition of A+B≧10 the flip-flop 178 is set, and during the next write period WF a correction by +6 is applied to the bit time signals $\Phi_2$ and $\Phi_3$. In the case of subtraction, if A−B<0 a borrow is produced, the flip-flop 178 is set without fail, and a correction of −6 is performed.

Figure 5C:
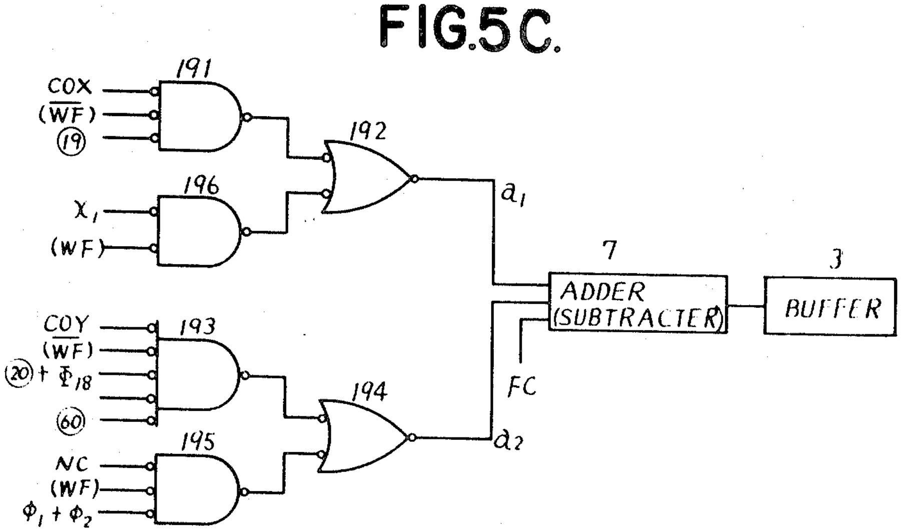

FIG. 5C shows logic constitution of an addition (subtraction) device which actually involves the decimal correction function. In order to perform a pure binary addition (subtraction) during the read period $\overline{WF}$, outputs COX and COY of the registers 1 and 2 respectively are introduced into the adder (subtractor) 7 through AND-OR-gates 191, 192, 193, and 194. Then, in order to perform a decimal correction operation during the write period WF, a decimal number 6 is introduced into the adder (subtractor) 7 through AND-OR-gates 195 and 194 during the period $WF_{t_2}$-$WF_{t_3}$ in response to the decimal carry (borrow) signal obtained at the time $\overline{WF}t_4$, and, in addition, output $X_1$ of pure binary addition (subtraction) passed through the buffer register 3 is introduced thereto through AND-OR-gates 196 and 192.

Figure 5D:
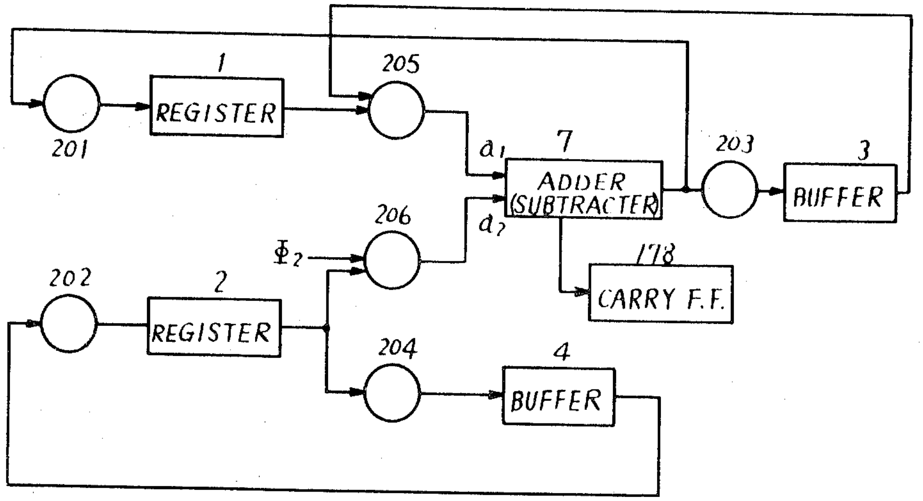

While the information path as is shown in FIG. 5D is formed of the above-mentioned various devices as a whole, as the operation progresses, the addition (subtraction) processing of binary coded decimal numbers is completed. In the drawing, 201 and 202 are driving gate networks for the registers 1 and 2, 203 and 204 are gate networks respectively provided at the entrances of the buffer registers 3 and 4, and 205 and 206 are gate networks related to addition (subtraction) of input signals $a_1$ and $a_2$.

First during the read period $\overline{WF}$ consisting of four bit times, the gate networks 201 and 202 are opened in order to drive the core registers 1 and 2, numerical value is read out bit by bit from the least significant digit of each of the registers. These read out numerical values are introduced into the adder (subtractor) 7, and thereby pure binary addition (subtraction) processing of four bits is performed serially. The addition (subtraction) output therefrom is provisionally stored in the buffer register 3. In the case that a carry (borrow) is present, the carry (borrow) flip-flop 178 is set at the time $\overline{WF}t_4$, and based upon the output of carry presence judgment a correction operation is performed during next write period WF of four bit times.

During the aforesaid period, the same adder (subtractor) 7 is used. The result of addition (subtraction) and the correction signal of +6(−6) are introduced into said adder (subtractor) 7, and the result of addition (subtraction) after the correction is immediately written into a predetermined digit position of the register. Accordingly, there is no wasted time. Although, a summand (minuend) A is previously fed into the register 1 and an addend (subtrahend) B is previously fed into the register 2, the registered contents of these two registers are once exchanged at the time of commencement of addition (subtraction), and, therefore, the summand (minuend) A is derived from the register 2, and during the write period WF after the addition (subtraction) it is written into the register 2 again through the buffer register 4.

In the case of A+B≧10, actual operating states of the core registers 1 and 2, the buffer register 3, and the carry flip-flops 177 and 178 are as shown in the following table.

Example: 5+7=12

| | | | 205 | | | | 206 | | | | 3 | | | | 177 | | 178 | |
|---|---|---|---|---|---|---|---|---|---|---|---|---|---|---|---|---|---|---|
| | | | COX 1–4 | COX 1–3 | COX 1–2 | COX 1–1 | COY 1–4 | COY 1–3 | COY 1–2 | COY 1–1 | X4 | X3 | X2 | X1 | $F_c$ in | $F_c$ | $N_c$ in | $N_c$ |
| $T_2$ | $\overline{WF}$ | $t_1$ | 0 | 1 | 0 | 1 | 0 | 1 | 1 | 1 | | | | | | | | |
| | | $t_2$ | | 0 | 1 | 0 | | 0 | 1 | 1 | | | | | 1 | | | |
| | | $t_3$ | | | 0 | 1 | | | 0 | 1 | 0 | | | | 1 | 1 | | |
| | | $t_4$ | | | | 0 | | | | 1 | 0 | 0 | | | 1 | 1 | | |
| | | | | | | | | | | 0 | 1 | 0 | 0 | | 0 | 1 | | |
| $T_2$ | WF | $t_1$ | 1 | 1 | 0 | 0 | 0 | 1 | 1 | 0 | 1 | 1 | 0 | 0 | 1 | 1 | 1 | |
| | | $t_2$ | | 1 | 1 | 0 | | 0 | 1 | 1 | 0 | | | | 0 | 0 | 1 | 1 |
| | | $t_3$ | | | 1 | 1 | | | 0 | 1 | 1 | 0 | | | 1 | 0 | | 1 |
| | | $t_4$ | | | | 1 | | | | 0 | 0 | 1 | 0 | | 0 | 1 | | 1 |
| $T_3$ | $\overline{WF}$ | $t_1$ | | | | | | | | | | | | | | | | 1 |
| | | | | | | | | | | | 0 | 0 | 1 | 0 | 1 | 1 | | 0 |

In the above table, COX 1–4 represents the core of the fourth place bit of the first place digit of the register 1, and COX 1–3, COX 1–2, and COX1–1, respectively, represent the cores of the third place bit, the second place bit and the first place bit of the first place digit of the register 1. Similarly, COY 1–4 through COY 1–1 represent the cores of from the fourth place bit to the first place bit of the first place digit of the register 2. $F_c$in and $F_c$, respectively, represent the input and the output of the carry flip-flop 177, and $N_c$in and $N_c$ respectively represent the input and the output of the flip-flop 178.

Shift Operation

At the time of various operation processes, it is evident that a function capable of shifting the registered contents of the registers is provided, but the core matrix plane itself does not have a shifting function. In the computer herein described, the shift operation is performed without adding any new device but by ingeniously utilizing the buffer registers 3 and 4, while employing the aforementioned driving system in which the read period and write period are continued for four bit times respectively.

More specifically, in such the core register as the abovementioned information of one digit unit can be read out and written in synchronism with the digit time signals $_{2}$– $_{17}$, and, therefore, together with the utilization of the buffer registers 3 and 4 the digit time signal and the read and write instruction signals are artfully captured, and thereby a shift function is provided in the register. An example of leftward shift will be explained hereinafter.

Figure 6A:
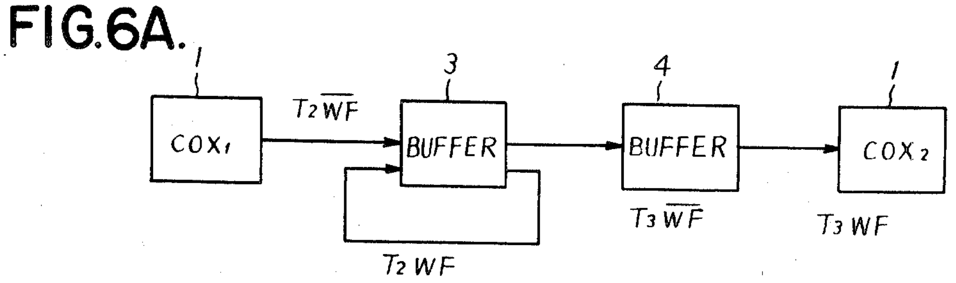
FIGS. 6A through 6C are block diagrams showing shift operations magnetic core registers.

FIG. 6A shows the flow of information in the case that the stored contents of the least significant digit $COX_1$ of the register 1 is to be shifted to the second place digit $COX_2$. The shift operation starts from the digit time $T_2$. During the four bit time $T_2\,\overline{WF}$, reading of the numerical value of the least significant digit is performed, and the read out contents is immediately introduced into the buffer register 3. As the buffer register 3 is formed of flip-flops, four bits of the numerical value of the least significant digit are registered at the time $T_2\,\overline{WF}t_1$ being accompanied with a time delay.

During the next write period $T_2$ WF of four bit time, the contents of the buffer register 3 is circulated. Further, at the time of next read period $T_3\,\overline{WF}$, four bits of the contents of the buffer register 3 are introduced into the buffer register 4. At this time, however, reading of the information of the second place digit is being performed separately. Then, during the write period $T_3$WF, the contents of the buffer register 4 are written into the second place digit $COX_2$ of the register 1. In other words, the second place digit of the register 1 is in a selected state in synchronization with the digit time signal $_{3}$ at this time, and, therefore, said contents of the least significant digit can be readily written in. At the same time, the numerical value read out from the second place digit separately circulates in the buffer register 3. By repeating said operation at each timing, leftward shift is performed digit by digit.

The operation of $COX_1$ and $COX_2$ of the register 1 and the operation of the buffer registers 3 and 4 are shown below.

| | | | $COX_1$ | | | | 3 | | | | 4 | | | | $COX_2$ | | | |
|---|---|---|---|---|---|---|---|---|---|---|---|---|---|---|---|---|---|---|
| $T_2$---------- | $\overline{WF}$ | $t_1$ | 0 | 1 | 1 | 1 | - - - | - - - | - - - | - - - | - - - | - - - | - - - | - - - | 0 | 0 | 0 | 1 |
| | | $t_2$ | 0 | 1 | 1 | 0 | 1 | 0 | 0 | 0 | - - - | - - - | - - - | - - - | 0 | 0 | 0 | 1 |
| | | $t_3$ | 0 | 1 | 0 | 0 | 1 | 1 | 0 | 0 | - - - | - - - | - - - | - - - | 0 | 0 | 0 | 1 |
| | | $t_4$ | 0 | 0 | 0 | 0 | 1 | 1 | 1 | 0 | - - - | - - - | - - - | - - - | 0 | 0 | 0 | 1 |
| $T_2$---------- | WF | $t_1$ | 0 | 0 | 0 | 0 | 0 | 1 | 1 | 1 | - - - | - - - | - - - | - - - | 0 | 0 | 0 | 1 |
| | | $t_2$ | 0 | 0 | 0 | 0 | 1 | 0 | 1 | 1 | - - - | - - - | - - - | - - - | 0 | 0 | 0 | 1 |
| | | $t_3$ | 0 | 0 | 0 | 0 | 1 | 1 | 0 | 1 | - - - | - - - | - - - | - - - | 0 | 0 | 0 | 1 |
| | | $t_4$ | 0 | 0 | 0 | 0 | 1 | 1 | 1 | 0 | - - - | - - - | - - - | - - - | 0 | 0 | 0 | 1 |
| $T_3$---------- | $\overline{WF}$ | $t_1$ | 0 | 0 | 0 | 0 | 0 | 1 | 1 | 1 | 0 | 0 | 0 | 0 | 0 | 0 | 0 | 1 |
| | | $t_2$ | 0 | 0 | 0 | 0 | 1 | 0 | 1 | 1 | 1 | 0 | 0 | 0 | 0 | 0 | 0 | 0 |
| | | $t_3$ | 0 | 0 | 0 | 0 | 0 | 1 | 0 | 1 | 1 | 1 | 0 | 0 | 0 | 0 | 0 | 0 |
| | | $t_4$ | 0 | 0 | 0 | 0 | 0 | 0 | 1 | 0 | 1 | 1 | 1 | 0 | 0 | 0 | 0 | 0 |
| $T_3$---------- | WF | $t_1$ | 0 | 0 | 0 | 0 | 0 | 0 | 0 | 1 | 0 | 1 | 1 | 1 | 0 | 0 | 0 | 1 |
| | | $t_2$ | 0 | 0 | 0 | 0 | 1 | 0 | 0 | 0 | 1 | 0 | 1 | 1 | 0 | 0 | 1 | 1 |
| | | $t_3$ | 0 | 0 | 0 | 0 | 0 | 1 | 0 | 0 | 0 | 1 | 0 | 1 | 0 | 1 | 1 | 1 |
| | | $t_4$ | 0 | 0 | 0 | 0 | 0 | 0 | 1 | 0 | 0 | 0 | 1 | 0 | 0 | 1 | 1 | 1 |

Figure 6B:
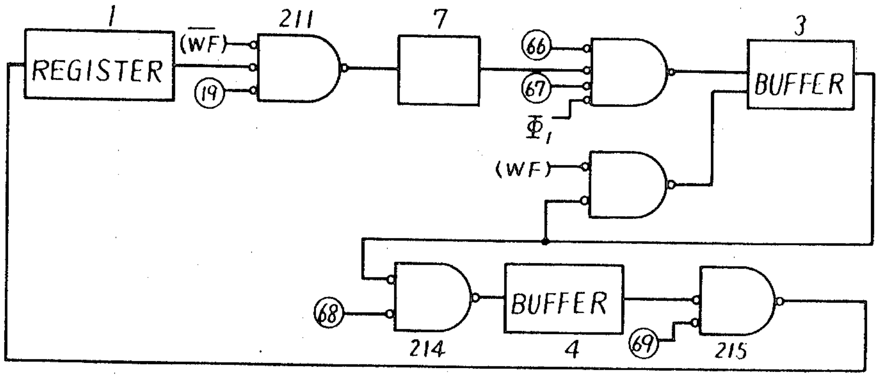

The logic of each part of the device relating to the actual shift operation is shown in FIG. 6B. Five AND-gates 211 through 215 are included. Although the adder (subtractor) 7 is present, the input introduced into the adder (subtractor) 7 during the shift operation is just only one, and no addition (subtraction) operation is performed and said input just goes therethrough.

In the case of rightward shift operation, on the other hand, it is much different from the well known method. Rightward shift instruction signal RS is generated, and the counting operation of the eicosal notation counter consisting of five flip-flops 74 through 78 is inverted by said signal (See Figure 3). More specifically, the counter operation is inverted so that the digit time signals $_{0}$– $_{19}$ are generated in the following order.

0 1 19 18 3 2 1 0

Figure 6C:
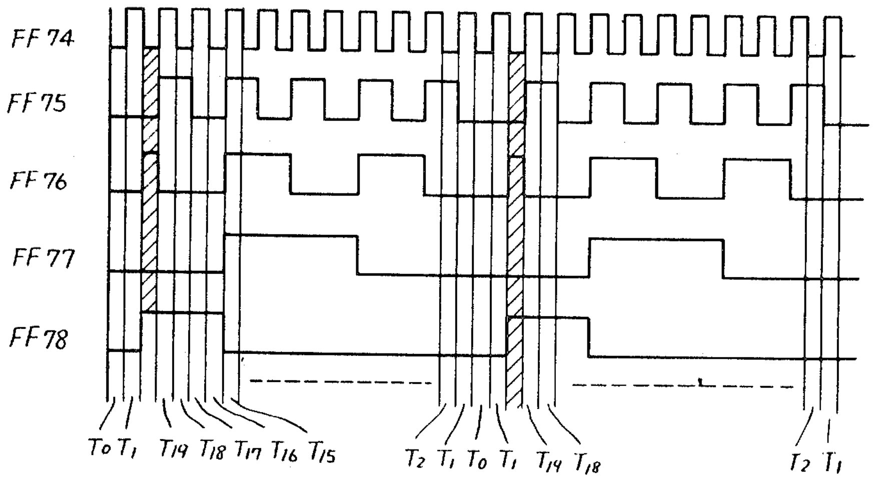

By utilizing the above-mentioned digit time signals $_{19}$– $_{0}$ of reversed order, the rightward shift operation can be performed within a very short time with an information circulation path which is completely the same as that of the case of leftward shift. In FIG. 6A, the rightward shift is possible by just substituting $COX_2$ and $COX_1$ one with the other and changing $T_2$ to $T_{17}$ and $T_3$ to $T_{16}$. More specifically, since the digit order of read and write of the core register is reversed the capture of write period corresponding to the adjacent lower place digit soon after a numerical value is once read out can be done very easily in the case of the rightward shift, and it is no longer necessary as is in the conventional well known system at the time of rightward shift by one digit to repeat the leftward shift operation for the number of times equal to the whole digit number of the register minus one. The operation wave forms of the flip-flops 74 through 78 under counter reversed conditions are shown in Figure 6C.

Indicating System

Figure 7A:
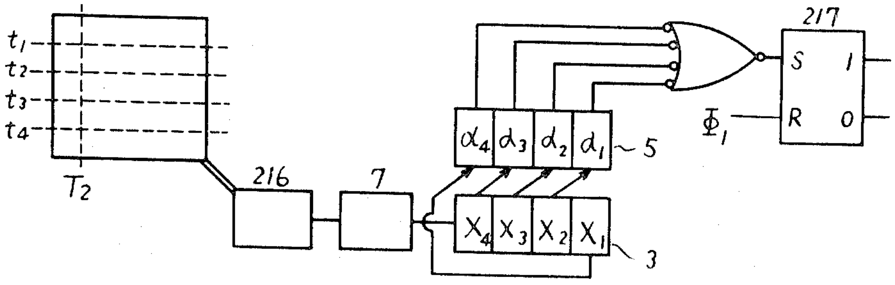
FIGS. 7A and 7B illustrate the output indicating device.

As an indicating system for electronic table type computers in general, glow discharge type numeral indicating tubes are used. For driving the tubes, DC static driving system has been generally used. At the present time so-called dynamic driving system can be used in which the indicating tubes are periodically and strongly driven by continuous pulses utilizing the persistence of human eyesight. Now, although the stored contents of the core matrix plane can be derived bit by bit serially, it is impossible to simultaneously read the contents of the all digits. From this viewpoint, the dynamic time division indicating system in synchronization with the digit time is convenient, and it is optimum for the output indication of the core matrix plane. The advantage of this system is that the number of driver transistors can be reduced. A circuit arrangement for actually indicating the output is shown in FIG. 7A. Amplifier 216 is to amplify read signals from the sense line of the register 1.

Suppose that the decimal number 7 is memorized in the least significant digit $COX_1$ or the register 1, the indicating time is in the nonoperation cycle, and referring to the circuit arrangement shown in the drawing the operation of $COX_1$ of the register and the buffer registers 3 and 5 are as shown in the following table.

| | $COX_1$ | | | | 3 | | | | |
|---|---|---|---|---|---|---|---|---|---|
| $T_2\,\overline{WF}t_1$------- | 0 | 1 | 1 | 1 | 0 | 0 | 0 | 0 | |
| $T_2\,\overline{WF}t_2$------- | 0 | 1 | 1 | 0 | 1 | 0 | 0 | 0 | |
| $T_2\,\overline{WF}t_3$------- | 0 | 1 | 0 | 0 | 1 | 1 | 0 | 0 | |
| $T_2\,\overline{WF}t_4$------- | 0 | 0 | 0 | 0 | 1 | 1 | 1 | 0 | |
| $T_2\,WFt_1$------- | 0 | 0 | 0 | 0 | 0 | 1 | 1 | 1 | |
| $T_2\,WFt_2$------- | 0 | 0 | 0 | 1 | 1 | 0 | 1 | 1 | |
| $T_2\,WFt_3$------- | 0 | 0 | 1 | 1 | 1 | 1 | 0 | 1 | |
| $T_2\,WFt_4$------- | 0 | 1 | 1 | 1 | 1 | 1 | 1 | 0 | |
| $T_2\,WFt_4$------- | 0 | 1 | 1 | 1 | 0 | 1 | 1 | 1 | →5 |

In the case that the digit time signals are generated in the order of normal forward direction, the contents of the core register $COX_1$ are not changed and 7 is being memorized from the digit time $T_3$ to the digit time $T_1$ of next cycle, and when the digit time $T_2$ comes the read and write operations are performed again, and thereby the indicating tube of the first digit is driven and illuminated. In practice, the time that 7 is indicated at the first digit is at the digit time $T_3$. By repetition of this, the numeral value 7 is externally indicated visually. In the indicating system herein described, however, the inversion operation of the digit counter at the time of rightward shift is utilized, thereby the read and write operations are performed from the most significant digit of the core register, and by using only one flip-flop said flip-flop is set by the most significant digit of effective numeral value which is not zero and which appears first, and an indicating tube driving circuit is operated for the first time by the set output therefrom.

Even when "0" is present within an effective numerical value, an inversion state does not occur when the reset input of said flip-flop is used as a digit time signal for indicating the contents of the least significant digit, and only those unnecessary "0" at the digit positions above the effective numeral value are prevented from being indicated.

Figure 7B:
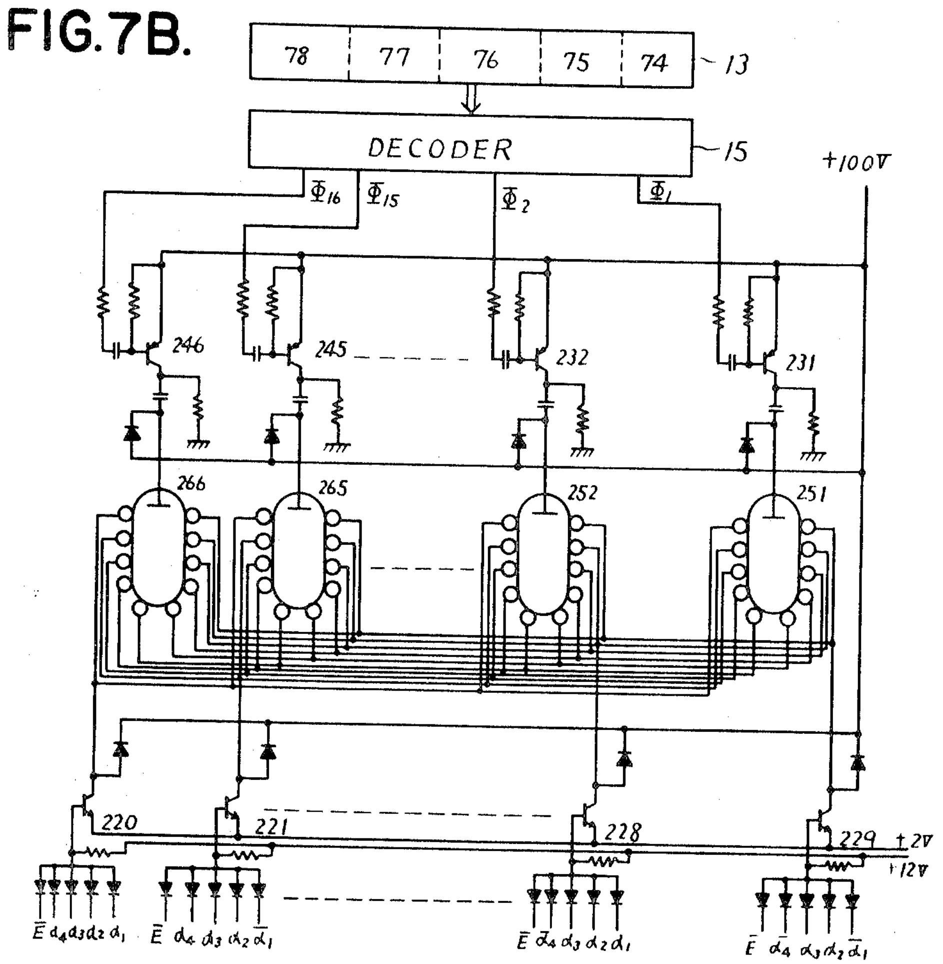

FIG. 7B shows the details of the indicating tube driving circuit. In this circuit 13 is a timing signal generator, and 15 is a decoder for obtaining bit time signals. Switches 220 through 229 are switched by cathode side driving pulses for selecting numerical values obtainable from conversion of the registered contents of the buffer register 5, and these switches control the paths from the cathodes of indicating tubes 251 through 266 to the ground. Switches 231 through 246 are switched by digit designating driving pulses or the digit time signals $T_{16}$ through $T_1$, and control the supply of applied voltage to the anode side of corresponding numeral indicating tubes 251 through 266. Set output $\bar{E}$ of ignition controlling flip-flop 217 is introduced into decimal decoder of at the cathode side as another gate input, and controls the operation of the indicating tube driving circuit. By said control, unnecessary "0'S" in the indicating device can be erased.

What is claimed is:

1. An electronic computer comprising at least two registers, each register having magnetic memory elements arranged in a matrix of rows and columns for storing binary coded digital information, each digit having a plurality of binary bits, row and column selecting circuits interconnected with said matrix and write-in and readout driving circuits connected with said selecting circuits, a timing signal generator having a bit time circuit for producing a train of bit time pulses shifted relative to each other and a digit time circuit for producing a train of digit time pulses, said said bit and the digit time pulses providing a time base for serial computing operations, an instruction circuit for producing write-in and readout instruction signals coordinated with said time pulses, first circuit means connecting said bit time circuit to said row selecting circuits of the magnetic matrix for applying bit time pulses selectively to the rows of said matrix and thereby selecting the bit positions to be written-in and read out, second circuit means connecting said digit time circuit to said column selecting circuits of said matrix for applying the digit time pulses selectively to the columns of said matrix for selecting the digit positions to be written-in and read out, third circuit means connecting said driving circuits to said instruction circuit to write-in and readout numerical information in the order in which said instruction signals are generated, an addition and subtraction device connected to said registers and at least one buffer register connected to said device and to at least one of said registers, and means for transferring information to said buffer register from said device, said buffer register including shift means for transferring the information to be written in said at least one of said registers to the same digit positions of the readout digits during the presence of the following write-in timing pulse.

2. An electronic computer according to claim 1 including correction means interconnected with said device and said at least one of said registers for applying numerical corrections of +6 and −6 to the input of said device during the write-in period immediately following a readout period.

3. An electronic computer according to claim 2 wherein said correction means includes judging means interconnected with said addition and subtraction device, said judging means determining the need for a correction during the final bit time pulse of a read out period and including a signal generator for producing an instruction signal in accordance with the determination of the judging means.

4. An electronic computer according to claim 1 wherein an addition or subtraction of one digit component consisting of four bits is performed during the presence of a readout pulse and during the subsequent write-in pulse a signal corresponding to the addition or subtraction result and the correction signal is fed back to said device during the second and third bit time pulses during the write-in period.

5. An electronic computer according to claim 1, including an indicating buffer register connected to the output of said buffer register, a plurality of digit indicating tubes connected to said indicating buffer register, and connections between said indicating buffer register and said generator to selectively cause said tubes to be operated in accordance with said digit time signals.

6. An electronic computer according to claim 5 including means for reading the contents of the indicating buffer register from the most significant digit position toward the least significant digit position, a flip-flop connected to said reading means and activated upon the presence of the first digit other than zero and means responsive to activation of said flip-flop to inactivate said indicating tubes for upper place digits above said most significant digit.

* * * * *